United States Patent
Chae (10) Patent No.: US 6,932,436 B2
(45) Date of Patent: Aug. 23, 2005

(54) HYDRAULIC WHEEL SYSTEM

(75) Inventor: Jong Byung Chae, Ulsan (KR)

(73) Assignee: Hyundai Motor Company, Seoul (KR)

( * ) Notice: Subject to any disclaimer, the term of this patent is extended or adjusted under 35 U.S.C. 154(b) by 67 days.

(21) Appl. No.: 10/750,673

(22) Filed: Dec. 31, 2003

(65) Prior Publication Data

US 2005/0099059 A1 May 12, 2005

(30) Foreign Application Priority Data

Nov. 12, 2003 (KR) .............................. 10-2003-0079730

(51) Int. Cl.$^7$ ............................................ B60B 23/00
(52) U.S. Cl. ........................... 301/111.01; 301/111.07; 301/35.61; 70/225; 403/31; 157/16
(58) Field of Search ........................ 301/35.61, 35.627, 301/35.629, 111.01, 115, 111.04, 111.07; 70/225; 403/31; 157/14, 15, 16, 17; 269/48.1

(56) References Cited

U.S. PATENT DOCUMENTS

| | | | | |
|---|---|---|---|---|
| 1,707,458 A | * | 4/1929 | Clench ..................... | 301/35.61 |
| 2,289,448 A | * | 7/1942 | Monroe et al. .......... | 301/35.61 |
| 2,490,486 A | * | 12/1949 | Spurlock et al. ............. | 301/9.1 |
| 2,960,130 A | * | 11/1960 | Smyser ........................ | 157/18 |
| 3,390,916 A | * | 7/1968 | Shelton ....................... | 301/9.1 |
| 4,781,233 A | * | 11/1988 | Williams ..................... | 157/16 |
| 4,833,760 A | * | 5/1989 | Sundstrom ................... | 24/609 |
| 5,408,854 A | * | 4/1995 | Chiu ........................... | 70/225 |
| 5,535,938 A | * | 7/1996 | Leduc ......................... | 228/212 |
| 6,371,486 B1 | * | 4/2002 | Yiu ............................. | 273/408 |
| 6,402,258 B1 | * | 6/2002 | Martinez ............... | 301/111.04 |

FOREIGN PATENT DOCUMENTS

| JP | 07-276935 | 10/1995 |
|---|---|---|
| JP | 09-039849 | 10/1997 |

* cited by examiner

*Primary Examiner*—Russell D. Stormer
(74) *Attorney, Agent, or Firm*—Morgan Lewis & Bockius LLP

(57) ABSTRACT

A hydraulic wheel system is provided which comprises a disc, a first piston, a wheel, a tire, a dismount button, and a wheel mounting member. The disc is provided with a first cylinder and a second cylinder communicating with each other. The first piston is slidably disposed within the first cylinder. The wheel is coupled to the disc so that a rotational force of the disc is transmitted to the wheel. The dismount button is configured to move the first piston. The wheel mounting member is provided in the disc. A second piston that is slidably disposed within the second cylinder is integrated with the wheel mounting member. The wheel mounting member is elastically supported by an elastic member in a direction opposite to the predetermined direction, and it is configured to be selectively connected to the wheel in response to a movement thereof.

15 Claims, 11 Drawing Sheets

FIG.8c

HYDRAULIC WHEEL SYSTEM

CROSS-REFERENCE TO RELATED APPLICATIONS

This application claims priority of Korean Application No. 10-2003-0079730, filed on Nov. 12, 2003, the disclosure of which is incorporated fully herein by reference.

FIELD OF THE INVENTION

The present invention relates to a hydraulic wheel system for a vehicle.

BACKGROUND OF THE INVENTION

Figure 1:
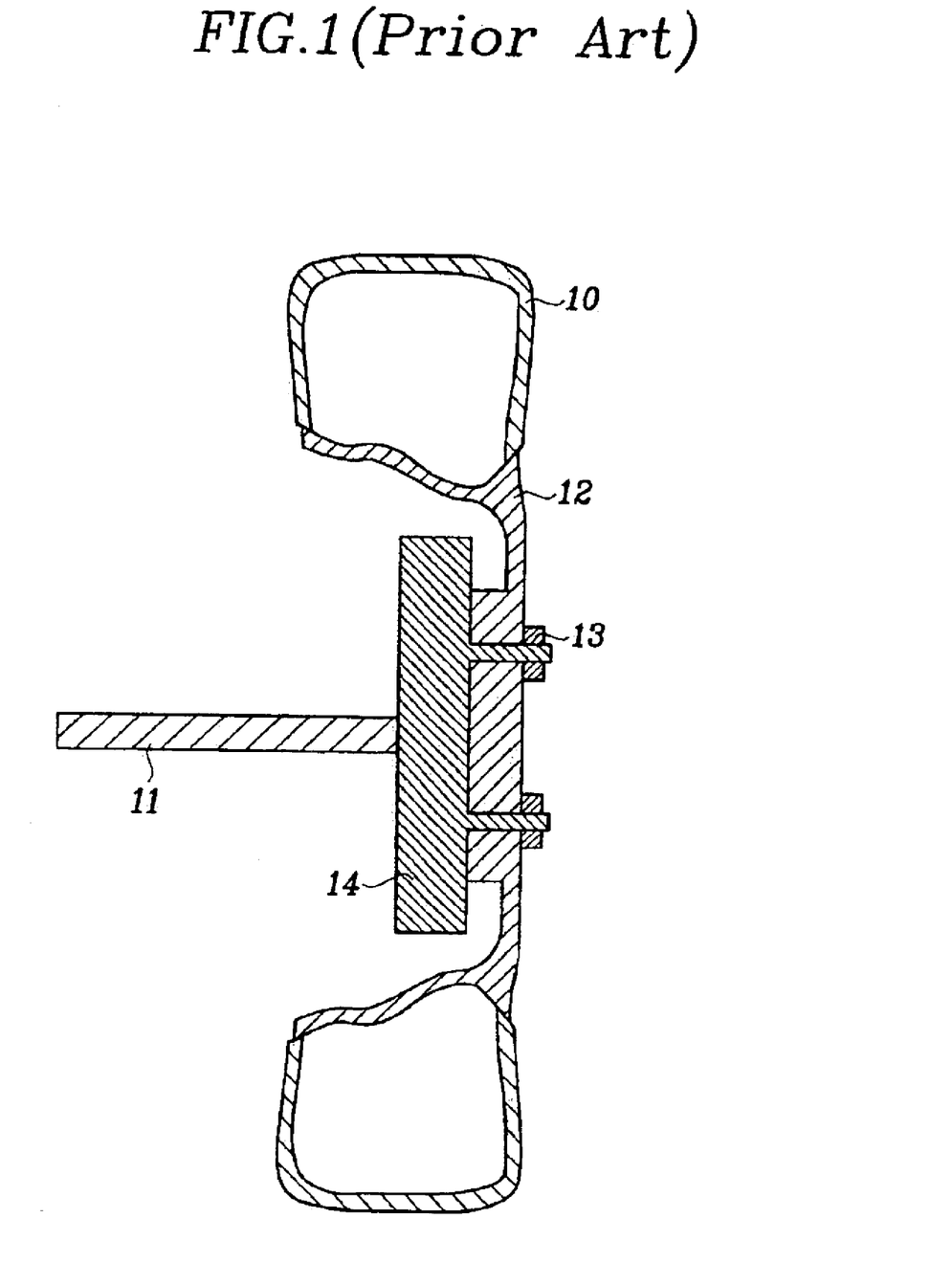
FIG. 1 shows a mechanical wheel system according to a prior art.

FIG. 1 shows a conventional mechanical wheel mounting structure. As shown in FIG. 1, the mechanical wheel mounting structure includes a wheel 12, a tire 10 that is coupled to the wheel 12, and a shaft 11 connected to a wheel mounting portion 14 that is coupled to the wheel 12 through a nut 13.

With such a mechanical wheel mounting structure, the wheel is removed and installed by man power, using a significant force. The wheel 12 is coupled to a vehicle body through four to six bolts, and the conventional mechanical tire structure can be affected by dust that is generated.

Furthermore, coupling along a direction of a centrifugal force can become weak. Still furthermore, tools are needed for removal or installation of the wheel, which is not easy to do even with the tools. Consequently, changing a tire is difficult and takes a long time. Also, the tire and wheel can be easily stolen.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention provides a hydraulic wheel system in which a wheel is easily mounted to a disc and dismounted from the disc, and wherein the wheel can be prevented from being stolen.

In a preferred embodiment of the present invention, the hydraulic wheel system comprises a disc, a first piston, a wheel, a tire, a dismount button, and a wheel mounting member. The disc is coupled to a drive shaft and is provided with a first cylinder and a second cylinder that communicate with each other and are filled with an operating fluid. The first piston is slidably disposed within the first cylinder such that the operating fluid moves to the second cylinder from the first cylinder in response to a movement thereof. The wheel is coupled to the disc so that a rotational force of the disc is transmitted to the wheel. The tire is coupled to the wheel. The dismount button is slidably coupled to the wheel and is configured to move the first piston in response to a movement thereof. The wheel mounting member is provided in the disc. A second piston that is slidably disposed within the second cylinder is integrated with the wheel mounting member so that the wheel mounting member is able to move in a predetermined direction in response to a pressure of the operating fluid in the second piston. The wheel mounting member is elastically supported by an elastic member in a direction opposite to the predetermined direction, and is configured to be selectively connected to the wheel in response to a movement thereof.

It is preferable that a hook is formed in the wheel, and that a coupling protrusion that is configured to be connected to the hook is formed in the wheel mounting member.

It is also preferable that the elastic member supporting the wheel mounting member is a coil spring.

It is preferable that the wheel mounting member is urged to move in a radially outward direction of the disc by the elastic member, and that the wheel mounting member is urged to move in a radially inward direction of the disc in response to a force of the operating fluid in the second cylinder.

It is further preferable that the wheel mounting member is positioned at a position where the wheel mounting member is coupled to the wheel, when the dismount button does not push the first piston.

It is also further preferable that the wheel mounting member is positioned at where the wheel mounting member is separated from the wheel, when the dismount button pushes the first piston.

Preferably, a spring receiving hole is formed in the wheel mounting member, and one end of the coil spring is inserted into the spring receiving hole.

Further preferably, the other end of the coil spring is inserted into an insertion protrusion that is formed on the disc.

It is preferable that at least one coupling pin is formed on a surface of the wheel, and at least one coupling hole into which the coupling pin is inserted is formed on the disc.

Preferably, the hydraulic wheel system further comprises a disc cover that is coupled to the disc, wherein a through hole into which the hook of the wheel is inserted is formed on the disc cover.

Further preferably, a receiving hole in which the wheel mounting member is formed on the disc, and wherein the disc cover is configured to cover a portion of the receiving hole to prevent the wheel mounting member from being separated from the receiving hole.

It is preferable that the dismount button is elastically supported by a return spring against the wheel.

It is further preferable that the return spring elastically supports the dismount button such that the dismount button is positioned to a position where the dismount button does not push the first piston.

It is preferable that the dismount button is configured to be locked, and that it can receive a dismount key being configured to unlock the dismount button.

It is further preferable that the dismount key is a start key.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 2:
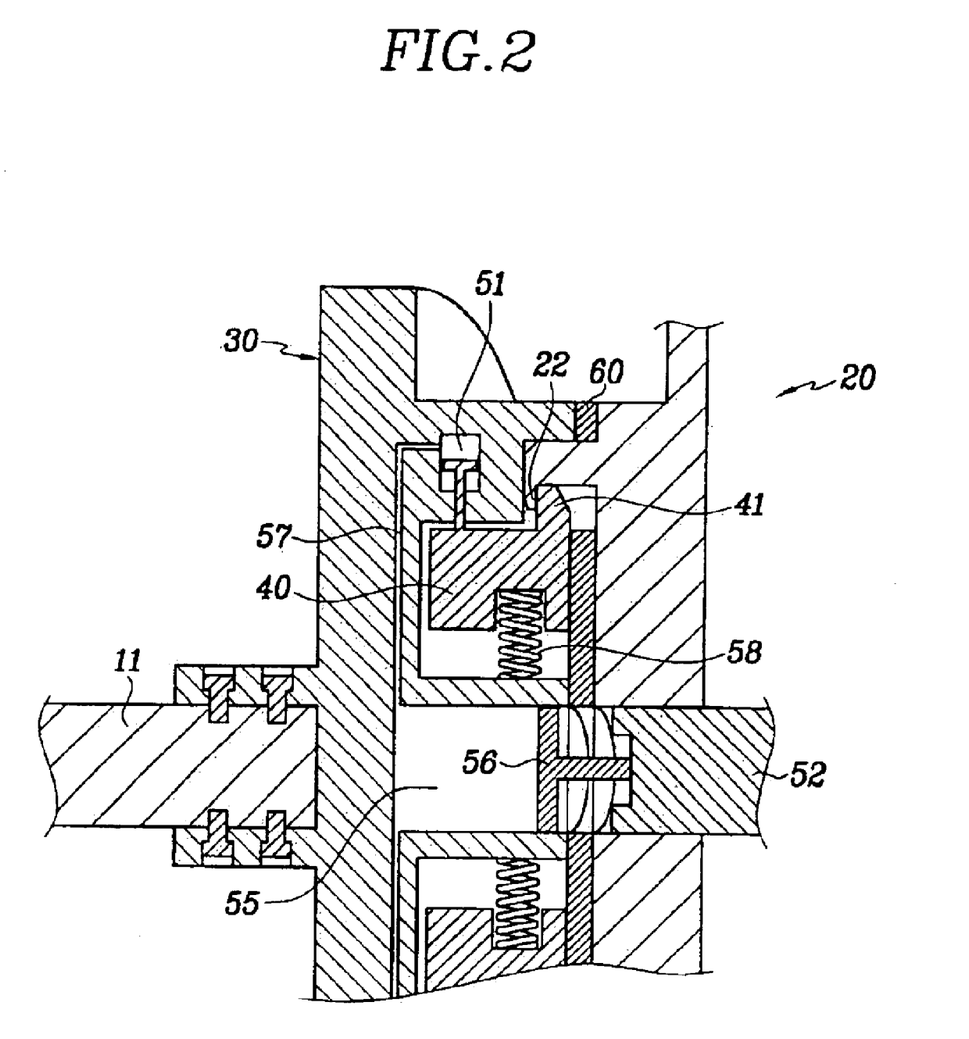
FIGS. 2 and 3 show the hydraulic wheel system according to the embodiment of the present invention.
Figure 3:
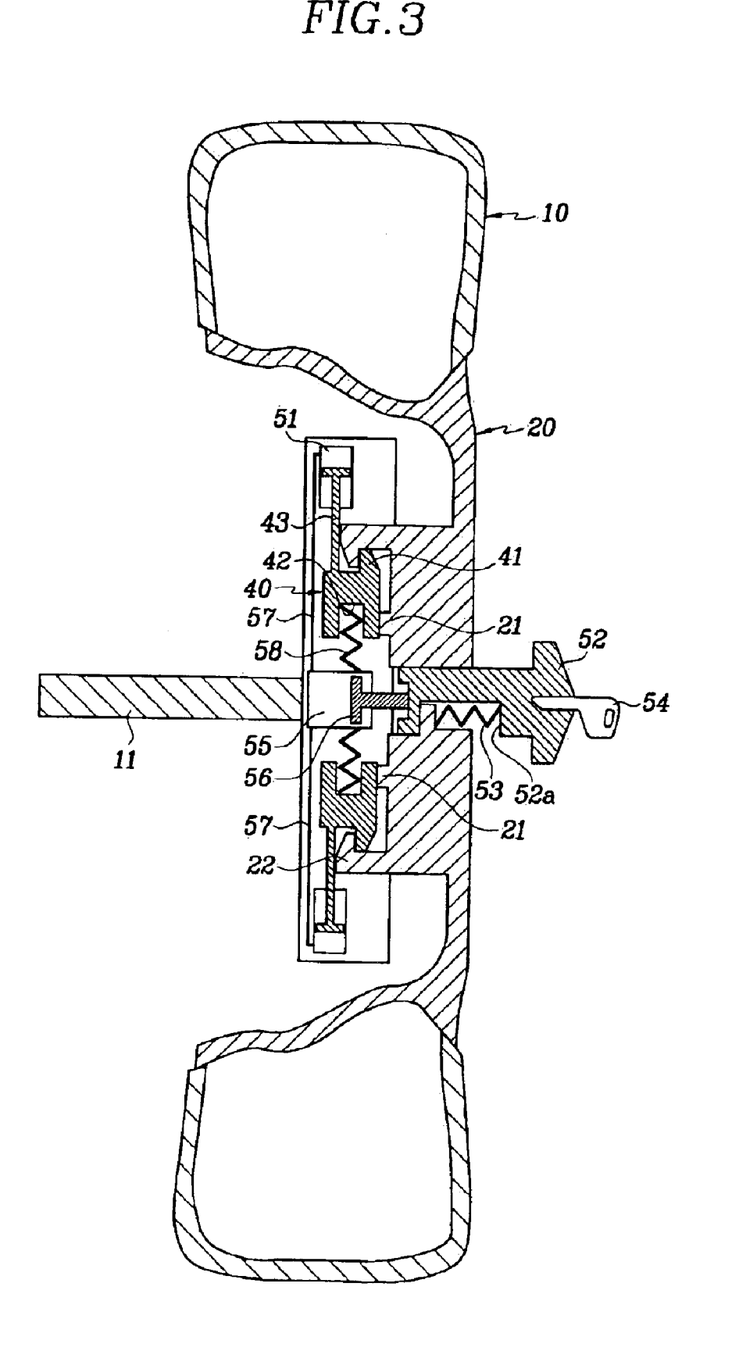
Figure 4A:
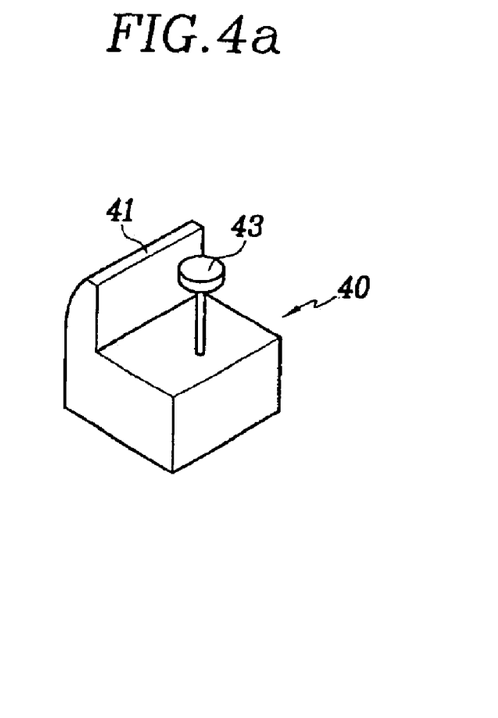
FIGS. 4a and 4b show a wheel mounting member of the hydraulic wheel system according to the embodiment of the present invention.
Figure 4B:
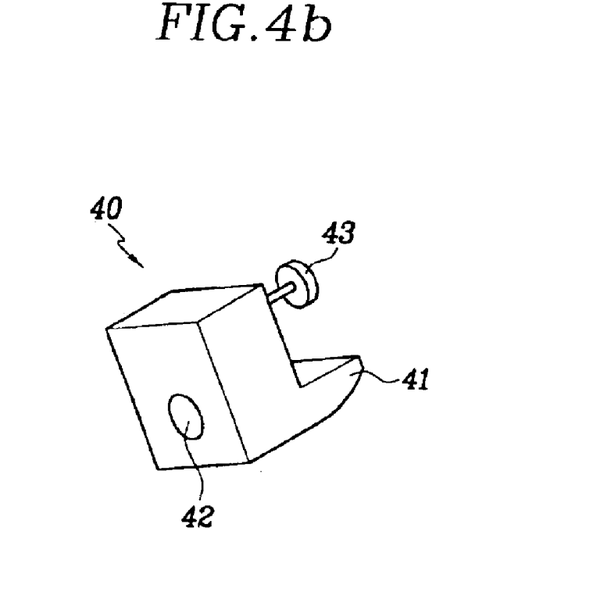

As shown in FIGS. 2 and 3, the hydraulic wheel system according to the embodiment of the present invention comprises a wheel 20, a tire 10 coupled to the wheel 20, a disc 30 fixedly coupled to a drive shaft 11 of a vehicle, and a wheel mounting member 40 for connecting the wheel 20 to the disc 30.

Figure 5:
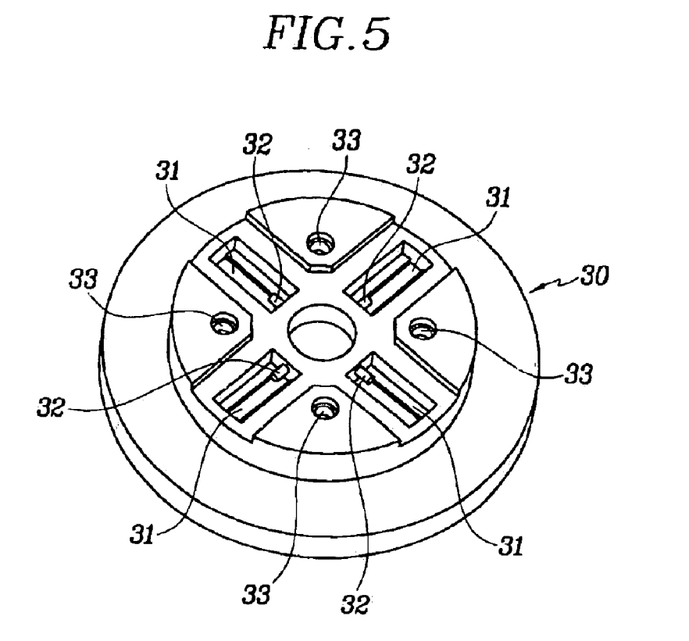
FIG. 5 is a perspective view of a disc of the hydraulic wheel system of FIG. 2.

As shown in FIG. 5, the disc 30 has a circular shape. A center cylinder 55 is provided in a center portion of the disc 30, and it is formed to be perpendicular to a radial direction of the disc 30. At least one local cylinder 51 is also provided in the disc 30. The local cylinder 51 is formed along the radial direction of the disc 30.

In this embodiment, a number of local cylinders 51 is four, but it is not restricted to this. When more than one local cylinder is provided, it is preferable that the local cylinders are disposed equidistantly along a circumferential direction of the disc 30.

A center piston 56 is slidably disposed within the center cylinder 55, and it is filled with an operating fluid. A fluid passageway 57 that connects the center cylinder 55 and the local cylinder 51 together is formed in the disc 30. Therefore, if the center piston 56 is moved in a left direction in FIG. 2, the operating fluid in the center cylinder 55 is supplied to the local cylinder 51 through the fluid passageway 57.

As shown in FIG. 5, receiving holes 31 are formed equidistantly along a circumferential direction of the disc 30. Coupling holes 33 are also formed equidistantly along the circumferential direction of the disc 30. A number of the receiving holes 31 is equal to the number of the local cylinders 51, and the receiving holes 31 are formed near the local cylinders 51. The wheel mounting member 40 is disposed into each of the receiving holes 31.

As shown in the drawings, a local piston 43 is integrated with the wheel mounting member 40, and the local piston 43 is slidably disposed within the local cylinder 51. A push spring 58 radially outwardly elastically supports the wheel mounting member 40.

That is, as shown in the drawings, a spring receiving hole 42 is formed in the wheel mounting member 40. One end of the push spring 58 is inserted into the spring receiving hole 42, and the other end of the push spring 58 is supported by a surface of the disc 30 defining the receiving hole 31. Accordingly, the wheel mounting member 40 is urged to move in a radially outward direction of the disc 30 by the push spring 58.

The push spring 58 can be a coil spring, and instead of the push spring 58, any arbitrary elastic member that can provide resilient force can be used.

An insertion protrusion 32 is formed on the surface defining the receiving hole 31 of the disc 30, and the insertion protrusion 32 is inserted into the push spring 58. Therefore, the push spring 58 can stably bias the wheel mounting member 40.

A coupling protrusion 41 is formed in the wheel mounting member 40. The wheel 20 is selectively coupled to the disc 30 through the wheel mounting member 40.

A plurality of coupling pins 21 are formed on a surface of the wheel 20 facing the disc 30. The coupling pins 21 are inserted into the coupling holes 33 of the disc 30. Therefore, the wheel 20 is connected to the disc 30, so that the wheel 20 can receive a transmitted rotational force of the drive shaft 11.

A plurality of hooks 22 are formed on a surface of the wheel 20 facing the disc 30. As shown in FIGS. 2 and 3, the wheel mounting member 40 is positioned at its outward maximum position by the elastic force of the push spring 58, and the hooks 22 of the wheel 20 are hooked to the coupling protrusions 41 of the wheel mounting member 40.

Figure 6:
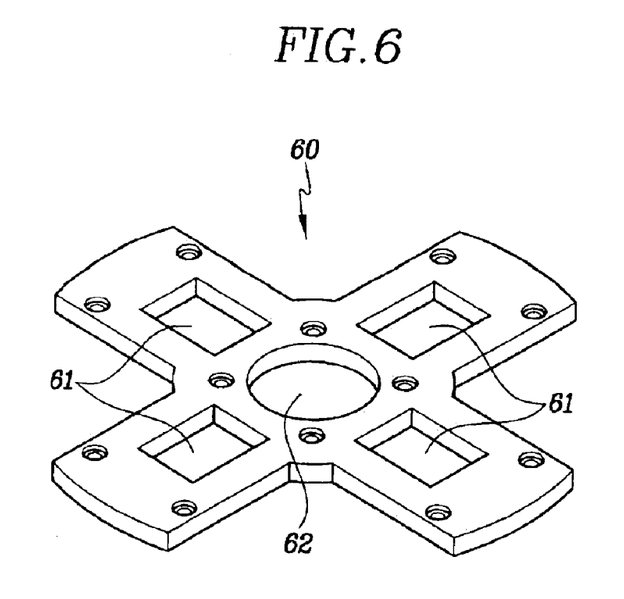
FIG. 6 is a perspective view of a disc cover of the hydraulic wheel system of FIG. 2.

A disc cover 60 is coupled to the disc 30 such that the disc cover 60 is disposed between the disc 30 and the wheel 20. As shown in FIG. 6, a plurality of first through holes 61 are equidistantly formed on the disc cover 60, and the hooks 22 of the wheel 20 are inserted into the first through holes 61.

A second though hole 62 is formed at an center portion of the disc cover 60, and the center piston 56 is inserted into the second through hole 63.

A dismount button 52 is provided at a center portion of the wheel 20. The dismount button 52 is slidably inserted into a through hole formed at a center of the wheel 20. The dismount button 52 is configured to push the center piston 56 that is disposed in the center cylinder 55 in a left direction in the drawing.

The dismount button 52 is elastically supported by a return spring 53 against the wheel 20. Therefore, if the dismount button 52 is released after it is pushed in the left direction by an external force, the dismount button 52 returns to its initial position by a resilient force of the return spring 53.

It is preferable that the hydraulic wheel system according to the embodiment of the present invention further comprises a dismount key 54, and that the dismount button 52 is configured to be locked. In the locked state, the dismount button 52 can not be moved. Using the dismount key 54, the dismount button 52 can be unlocked. As an example, a key hole (not shown) is formed in the dismount button 52, and the dismount button 52 is equipped with a locking device. By inserting the dismount key 54 into the key hole and turning the dismount key 54, the dismount button 52 can be unlocked. Preferably, the dismount key 54 can be a start key.

Operations of the hydraulic wheel system according to the embodiment of the present invention will be explained.

First, referring to FIGS. 7a to 7c, processes for mounting the wheel 20 to the disc 30 will be explained.

Figure 7A:
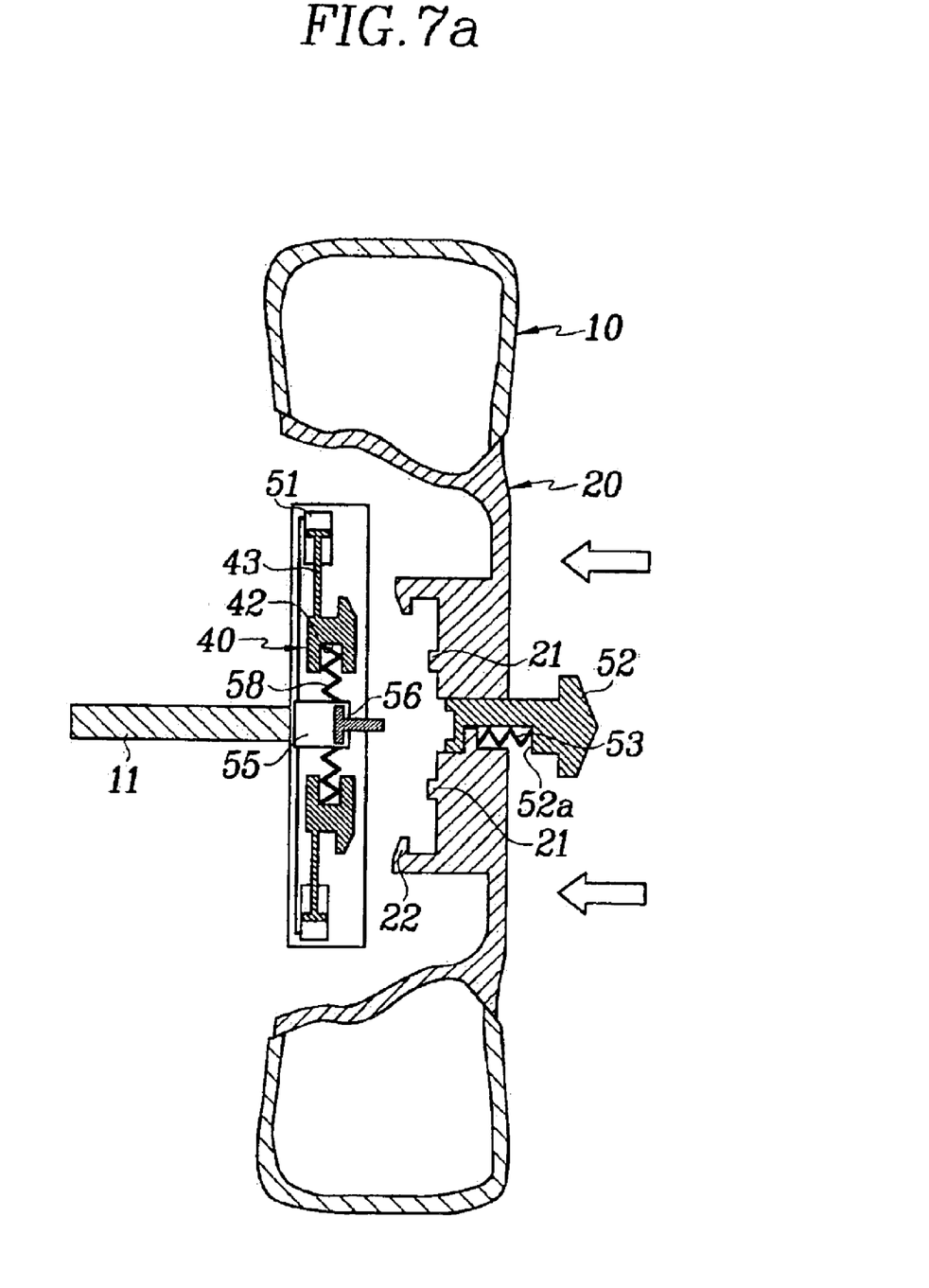
FIGS. 7a to 7c show processes for mounting a wheel in the hydraulic wheel system according the embodiment of the present invention.
Figure 7B:
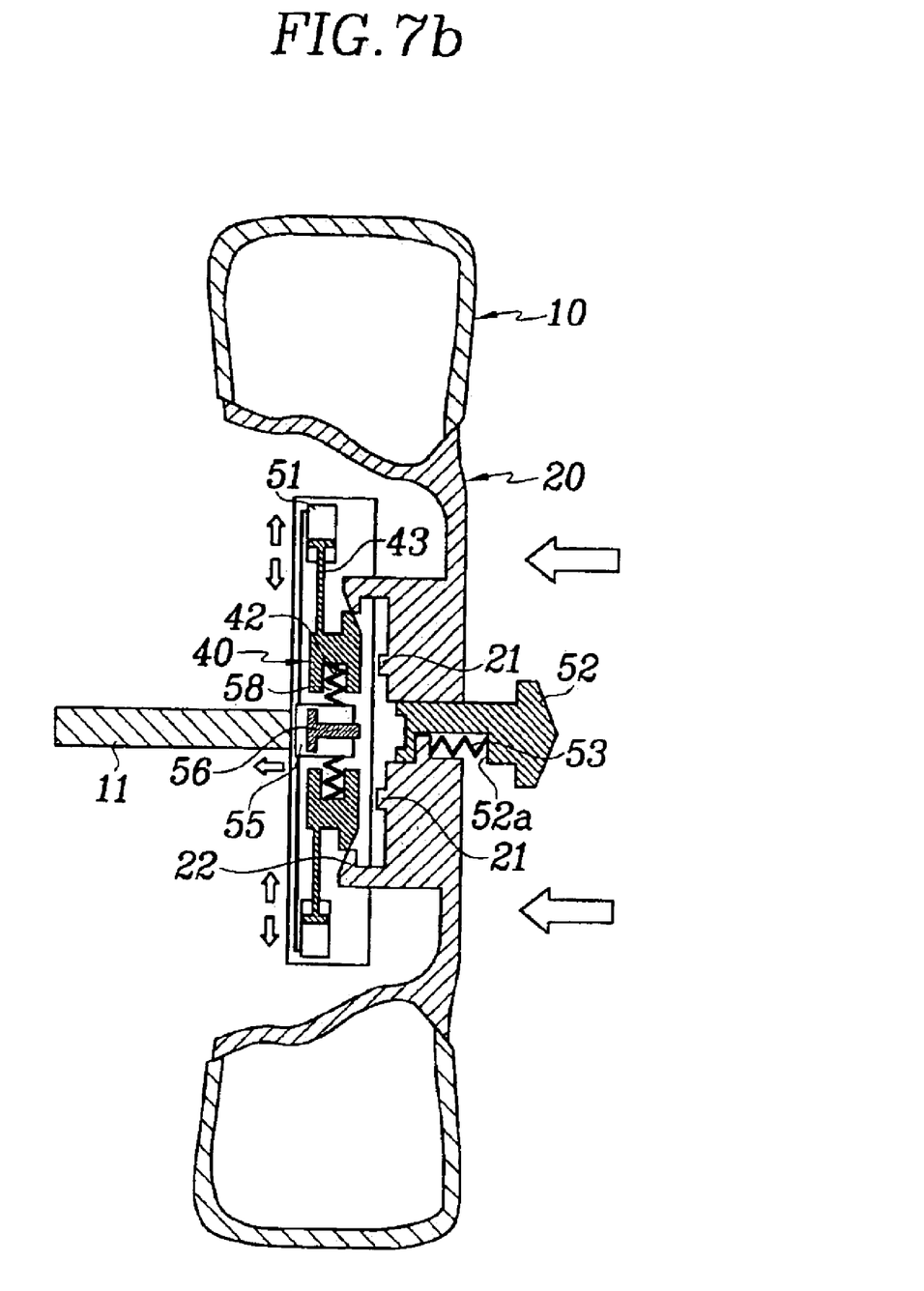
Figure 7C:
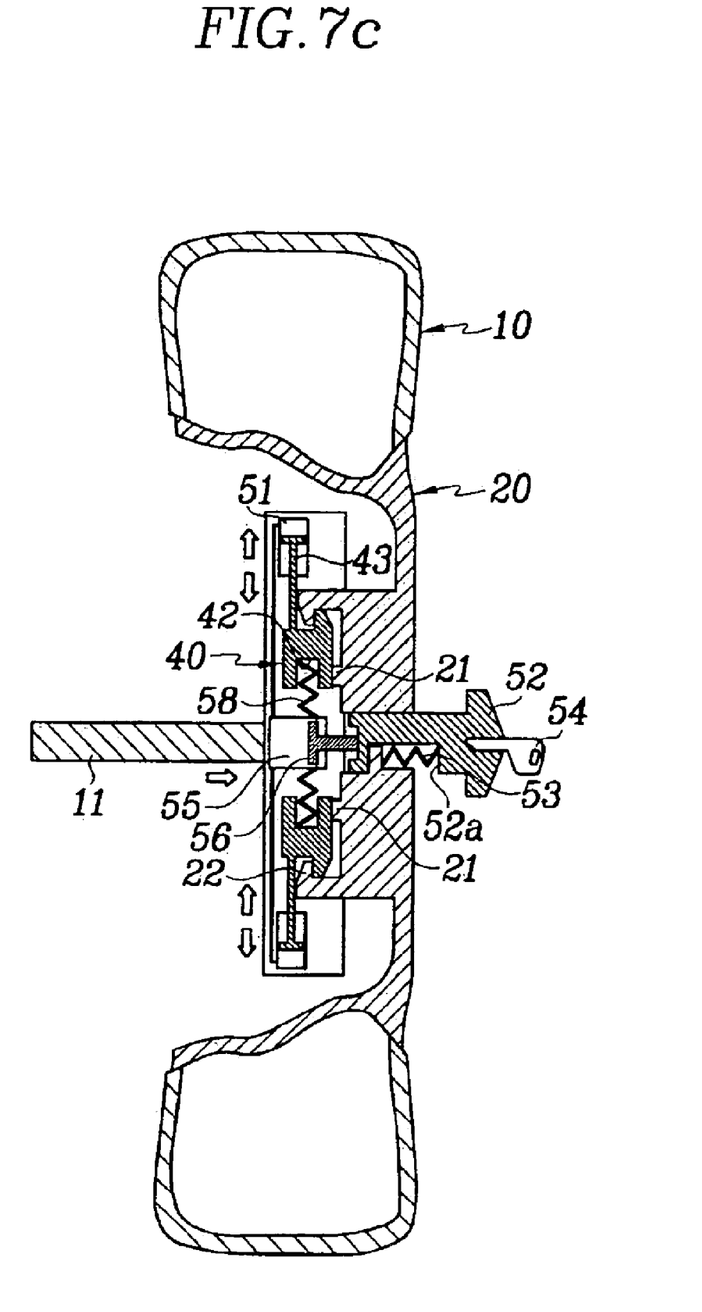

FIG. 7a shows the wheel 20 and the disc 30 in an uncoupled state. As shown in FIG. 7b, as the wheel 20 approaches the disc 30, the hook 22 of the wheel 20 pushes the wheel mounting member 40 toward a center of the disc 30. At this time, the push spring 58 is compressed, and the operating fluid moves to the local cylinder 51 from the center cylinder 51. When the wheel 20 is completely coupled to the disc 30, as shown in FIG. 7c, the wheel mounting member 40 is urged to move in a radially outward direction of the disc 30 by the resilient force of the push spring 58 and the operating fluid moves to the center cylinder 55.

Then, referring to FIGS. 8a to 8c, processes for dismounting the wheel 20 from the disc 30 will be explained.

Figure 8A:
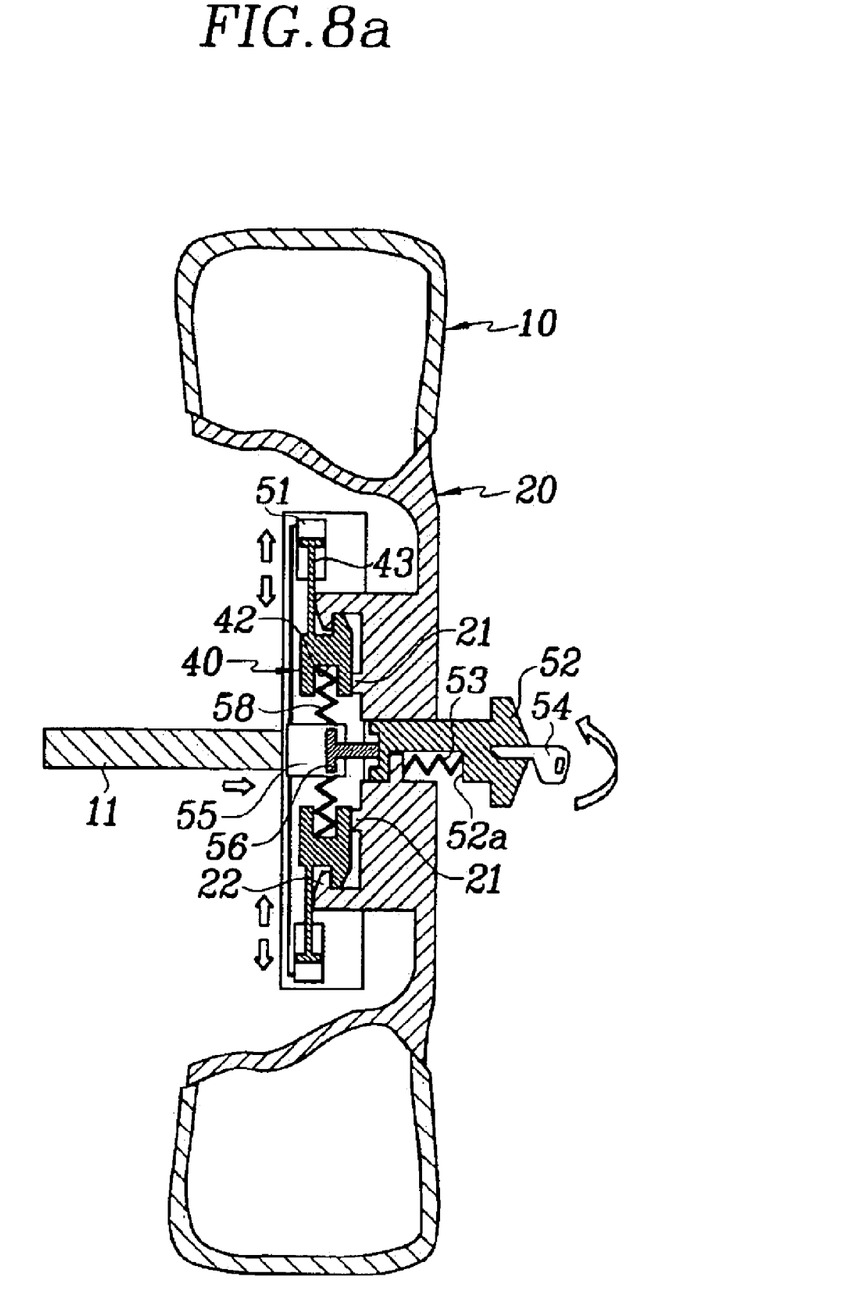
FIGS. 8a to 8c show processes for dismounting a wheel in the hydraulic wheel system according the embodiment of the present invention.

At first, as shown in FIG. 8a, the locked state of the dismount button 52 is released by inserting the dismount key 54 into the dismount button 52 and turning the dismount key 54.

Figure 8B:
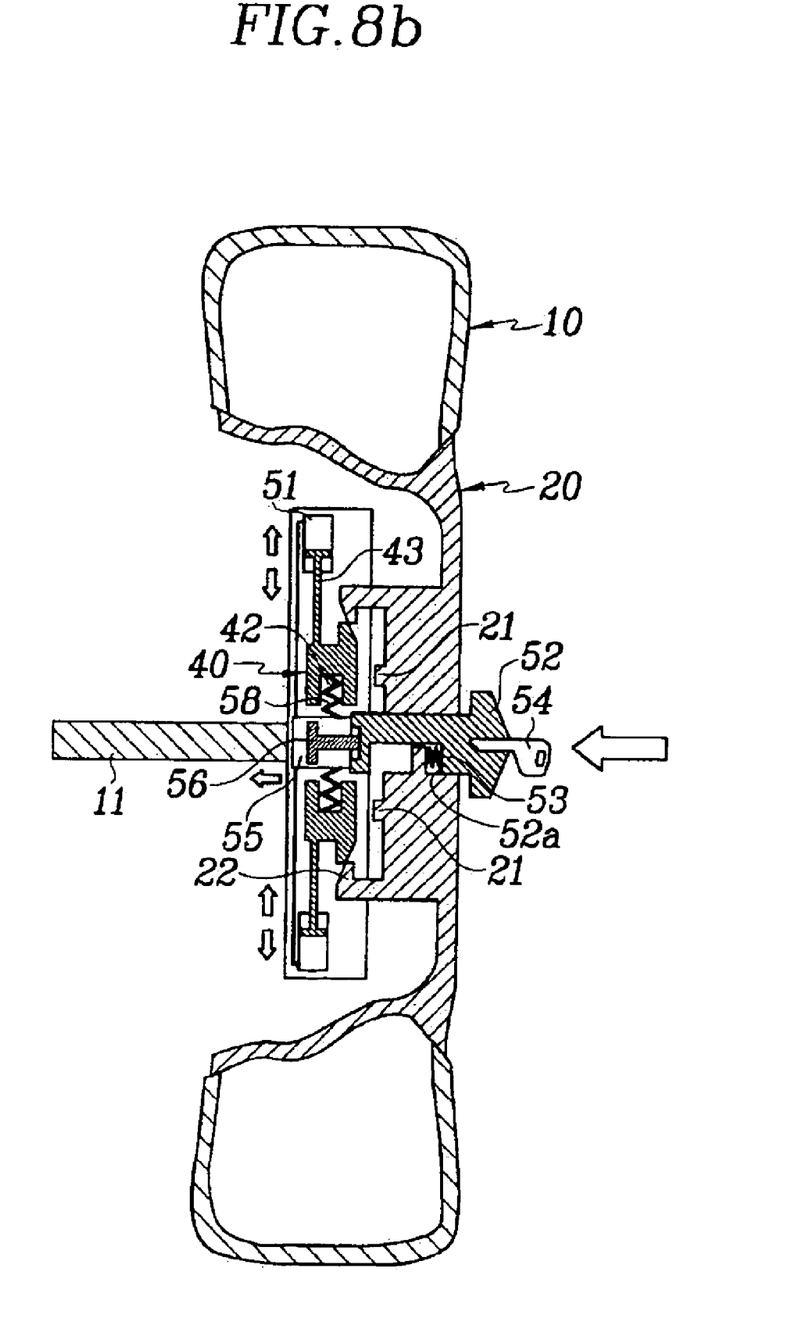

Then, as shown in FIG. 8b, by pushing the dismount button 52, the dismount button 52 pushes the center piston 56. Accordingly, the operating fluid in the center cylinder 55 is urged to move to the local cylinder 51, so that a force due to the operating fluid acts on the local piston 43. If the force due to the operating fluid becomes greater than the resilient force of the push spring 58, the wheel mounting member 40 is urged to move toward the center of the disc 30. Therefore, the coupling protrusion 41 of the wheel mounting member 40 is separated from the hook 22 of the wheel 20, so that the wheel 20 is released from the disc 30.

Figure 8C:
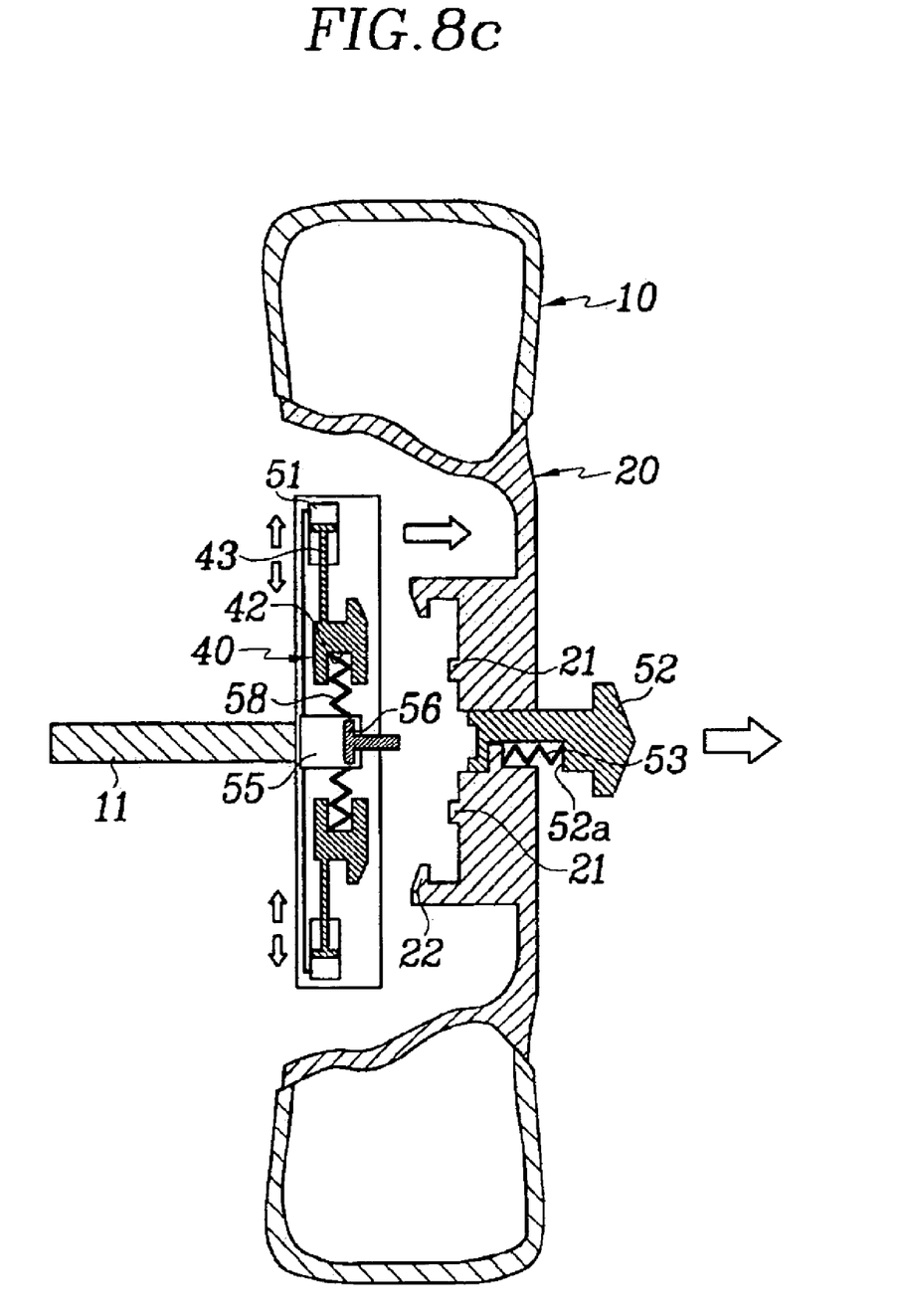

If the wheel 20 is completely separated from the disc 30, as shown in FIG. 8c, the wheel mounting member 40 is urged to move in a radially outward direction of the disc 30 by the resilient force of the push spring 58, and the operating fluid moves to the center cylinder 55.

According to the embodiment of the present invention, the wheel can be easily mounted to the disc or dismounted from the disc. In addition, the dismount button is unlocked by the dismount key, so that the wheel can be prevented from being stolen. Furthermore, because the wheel mounting member is urged to move outwardly by centrifugal force while a vehicle is running, the wheel can firmly connected to the disc.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic wheel system comprising:
   a disc coupled to a drive shaft and being provided with a first cylinder and a second cylinder that communicate with each other and are filled with an operating fluid;
   a first piston that is slidably disposed within the first cylinder such that the operating fluid moves to the second cylinder from the first cylinder in response to a movement thereof;
   a wheel coupled to the disc so that a rotational force of the disc is transmitted to the wheel;
   a tire coupled to the wheel;
   a dismount button slidably coupled to the wheel and configured to move the first piston in response to a movement thereof; and
   a wheel mounting member provided in the disc, a second piston that is slidably disposed within the second cylinder being integrated with the wheel mounting member so that the wheel mounting member is able to move in a predetermined direction in response to a pressure of the operating fluid in the second piston, the wheel mounting member being elastically supported by an elastic member in a direction opposite to the predetermined direction, the wheel mounting member being configured to be selectively connected to the wheel in response to a movement thereof.

2. The hydraulic wheel system of claim 1, wherein a hook is formed in the wheel, and a coupling protrusion that is configured to be connected to the hook is formed in the wheel mounting member.

3. The hydraulic wheel system of claim 1, wherein the elastic member supporting the wheel mounting member is a coil spring.

4. The hydraulic wheel system of claim 1, wherein the wheel mounting member is urged to move in a radially outward direction of the disc by the elastic member, and the wheel mounting member is urged to move in a radially inward direction of the disc in response to a force of the operating fluid in the second cylinder.

5. The hydraulic wheel system of claim 4, wherein the wheel mounting member is positioned where the wheel mounting member is coupled to the wheel, when the dismount button does not push the first piston.

6. The hydraulic wheel system of claim of claim 4, wherein the wheel mounting member is positioned where the wheel mounting member is separated from the wheel, when the dismount button pushes the first piston.

7. The hydraulic wheel system of claim of claim 3, wherein a spring receiving hole is formed in the wheel mounting member, and one end of the coil spring is inserted into the spring receiving hole.

8. The hydraulic wheel system of claim 7, wherein the other end of the coil spring is inserted into an insertion protrusion that is formed on the disc.

9. The hydraulic wheel system of claim 1, wherein at least one coupling pin is formed on a surface of the wheel, and at least one coupling hole into which the coupling pin is inserted is formed on the disc.

10. The hydraulic wheel system of claim 2, further comprising a disc cover that is coupled to the disc, wherein a through hole into which the hook of the wheel is inserted is formed on the disc cover.

11. The hydraulic wheel system of claim 10, wherein a receiving hole in which the wheel mounting member is disposed is formed on the disc, and wherein the disc cover is configured to cover a portion of the receiving hole to prevent the wheel mounting member from being separated from the receiving hole.

12. The hydraulic wheel system of claim 1, wherein the dismount button is elastically supported by a return spring against the wheel.

13. The hydraulic wheel system of claim 12, wherein the return spring elastically supports the dismount button such that the dismount button is positioned to a position where the dismount button does not push the first piston.

14. The hydraulic wheel system of claim 1, wherein the dismount button is configured to be locked, and further comprising a dismount key being configured to unlock the dismount button.

15. The hydraulic wheel system of claim 14, wherein the dismount key is a start key.

* * * * *